(12) United States Patent
Zeng et al.

(10) Patent No.: US 10,001,945 B2
(45) Date of Patent: Jun. 19, 2018

(54) METHOD OF STORING DATA AND DATA STORAGE MANAGING SERVER

(71) Applicant: HANGZHOU HIKVISION SYSTEM TECHNOLOGY CO., LTD., Hangzhou, Zhejiang (CN)

(72) Inventors: Fanli Zeng, Hangzhou (CN); Peng Lin, Hangzhou (CN); Qiqian Lin, Hangzhou (CN); Weichun Wang, Hangzhou (CN)

(73) Assignee: HANGZHOU HIKVISION SYSTEM TECHNOLOGY CO., LTD., Hangzhou, Zhejiang (CN)

( * ) Notice: Subject to any disclaimer, the term of this patent is extended or adjusted under 35 U.S.C. 154(b) by 14 days.

(21) Appl. No.: 15/321,221

(22) PCT Filed: Nov. 4, 2014

(86) PCT No.: PCT/CN2014/090212
§ 371 (c)(1),
(2) Date: Dec. 22, 2016

(87) PCT Pub. No.: WO2015/196686
PCT Pub. Date: Dec. 30, 2015

(65) Prior Publication Data
US 2017/0153819 A1    Jun. 1, 2017

(30) Foreign Application Priority Data
Jun. 26, 2014 (CN) .......................... 2014 1 0292889

(51) Int. Cl.
*G06F 12/00* (2006.01)
*G06F 3/06* (2006.01)
*G06F 11/14* (2006.01)

(52) U.S. Cl.
CPC ............ *G06F 3/065* (2013.01); *G06F 3/0619* (2013.01); *G06F 3/0673* (2013.01); *G06F 11/1456* (2013.01)

(58) Field of Classification Search
None
See application file for complete search history.

(56) References Cited

U.S. PATENT DOCUMENTS

| 2010/0293112 A1* | 11/2010 | Prahlad | ................. G06F 3/0605 |
|---|---|---|---|
| | | | 705/418 |
| 2011/0191302 A1 | 8/2011 | Nasu et al. | |
| 2014/0258658 A1* | 9/2014 | Best | .................... G06F 11/2094 |
| | | | 711/162 |

FOREIGN PATENT DOCUMENTS

| CN | 101187948 A | 5/2008 |
|---|---|---|
| CN | 101394347 A | 3/2009 |

(Continued)

OTHER PUBLICATIONS

International Search Report for PCT/CN2014/090212, ISA/CN, Haidian District, Beijing, dated Mar. 30, 2015.
(Continued)

*Primary Examiner* — Brian Peugh
(74) *Attorney, Agent, or Firm* — Harness, Dickey & Pierce, P.L.C.

(57) ABSTRACT

A method of storing data includes: determining a number of copies to be initially stored for a data block x after receiving a request for storing the data block x, and storing the data block x according to the number of copies to be initially stored; and periodically determining a current importance level of the data block x, determining whether a number of copies corresponding to the importance level is identical to a number of currently stored copies of the data block x, and adjusting the number of currently stored copies of the data block x to be consistent with the number of copies corre-
(Continued)

```
┌─────────────────────────────────────────────────────┐
│ determine the number of copies to be initially stored for │ ─ 11
│ any data block x after receiving a request for storing the│
│ data block x, and store the data block x according to the │
│              number of copies                       │
└─────────────────────────────────────────────────────┘
                         │
                         ▼
┌─────────────────────────────────────────────────────┐
│ perform the following actions periodically: determining a │
│    current importance level of the data block x, judging  │
│    whether the number of copies corresponding to the      │
│    importance level is identical to the number of currently│ ─ 12
│ stored copies of the data block x; if they are not identical,│
│ adjusting the number of currently stored copies of the data│
│ block x to be the number corresponding to the importance  │
│      level; a higher importance level is corresponding to a│
│          larger number than a lower importance level      │
└─────────────────────────────────────────────────────┘
``` sponding to the importance level if the number of copies corresponding to the importance level is not identical to the number of currently stored copies of the data block x. The present disclosure also provides a data storage managing server.

19 Claims, 5 Drawing Sheets

(56) References Cited

FOREIGN PATENT DOCUMENTS

| CN | 102096698 A | 6/2011 |
|---|---|---|
| CN | 102622184 A | 8/2012 |

OTHER PUBLICATIONS

Written Opinion of the ISA for PCT/CN2014/090212, ISA/CN, Haidian District, Beijing, dated Mar. 30, 2015.

* cited by examiner

| Data Type | Importance Level | Start Time | End Time | Total visits | Number of copies | Copy 1 | | ... | Copy n | |
|---|---|---|---|---|---|---|---|---|---|---|
| | | | | | | Data Node | Location | ... | Data Node | Location |

METHOD OF STORING DATA AND DATA STORAGE MANAGING SERVER

CROSS-REFERENCE TO RELATED APPLICATIONS

This application is a 371 U.S. National Stage of International Application No. PCT/CN2014/090212, filed on Nov. 4, 2014, which claims the benefit of and priority to Chinese Patent Application No. 201410292889.5, filed on Jun. 26, 2014. The disclosures of the above applications are incorporated herein by reference.

TECHNICAL FIELD

The present disclosure relates to data processing technology, and particularly, to a method of storing data and a data storage managing server.

BACKGROUND

When data is stored according to a conventional mechanism, original data stored is generally copied for backup Data backup refers to a technology in which a copy or a duplicate of original data is stored separately from the original data, and is used to recover the original data in case the original data is lost or damaged due to factors such as hardware failure, virus attack, human error, or the like.

Ordinarily, more backup copies are required to increase data reliability.

SUMMARY

In view of the foregoing, the present disclosure provides a method of storing data and a data storage managing server to enable rational use of storage resources.

To achieve the above objectives, the technical mechanism of the present disclosure is as follows.

A method of storing data may include:
determining the number of copies to be initially stored for a data block x after receiving a request for storing the data block x, and storing the data block x according to the number of copies to be initially stored; and
performing the following actions periodically: determining a current importance level of the data block x, determining whether the number of copies corresponding to the importance level is identical to the number of currently stored copies of the data block x, and adjusting the number of currently stored copies of the data block x to be consistent with the number of copies corresponding to the importance level when the number of copies corresponding to the importance level is not identical to the number of currently stored copies of the data block x; wherein a higher importance level is corresponding to more copies than a lower importance level.

A data storage managing server may include:
a first processing module, configured to determine the number of copies to be initially stored for a data block x after receiving a request for storing the data block x sent by a user device, instruct the user device to store the data block x into data nodes according to the number of copies to be initially stored, and instruct a second processing module to start functioning; and
the second processing module, configured to perform the following actions periodically: determining a current importance level of the data block x, determining whether the number of copies corresponding to the importance level is identical to the number of currently stored copies of the data block x, and adjusting the number of the currently stored copies of the data block x to be consistent with the number of copies corresponding to the importance level when the number of copies corresponding to the importance level is not identical to the number of currently stored copies of the data block x; wherein a higher importance level is corresponding to more copies than a lower importance level.

A server may include:
a storage device;
at least one processor; and
one or a plurality of instructions stored in the storage device, executable by the at least one processor to:
determine the number of copies to be initially stored for a data block x after receiving a request for storing the data block x, and store the data block x according to the number of copies; and
perform the following actions periodically: determining a current importance level of the data block x, determining whether the number of copies corresponding to the importance level is identical to the number of currently stored copies of the data block x, and adjusting the number of currently stored copies of the data block x to be consistent with the number of copies corresponding to the importance level if the number of copies corresponding to the importance level is not identical to the number of currently stored copies of the data block x; wherein a higher importance level is corresponding to more copies than a lower importance level.

DETAILED DESCRIPTIONS

When multiple copies are backup for original data, if there are a large number of original data items to be backup, it is not advisable to store a fixed number of backup copies for each original data item without taking different importance levels of the original data items into consideration. For example, when the fixed number of copies is 2, two backup copies are generated for each of an original data item having a higher importance level and an original data item having a lower importance level. Two backup copies may be not enough for the original data item having a higher importance level and may be too many for the original data item having a lower importance level, thus the storage resources are not used in a rational way.

In view of the disadvantages of the conventional mechanism, some embodiments of the present disclosure provide a data storage mechanism to use storage resources rationally.

Figure 1:
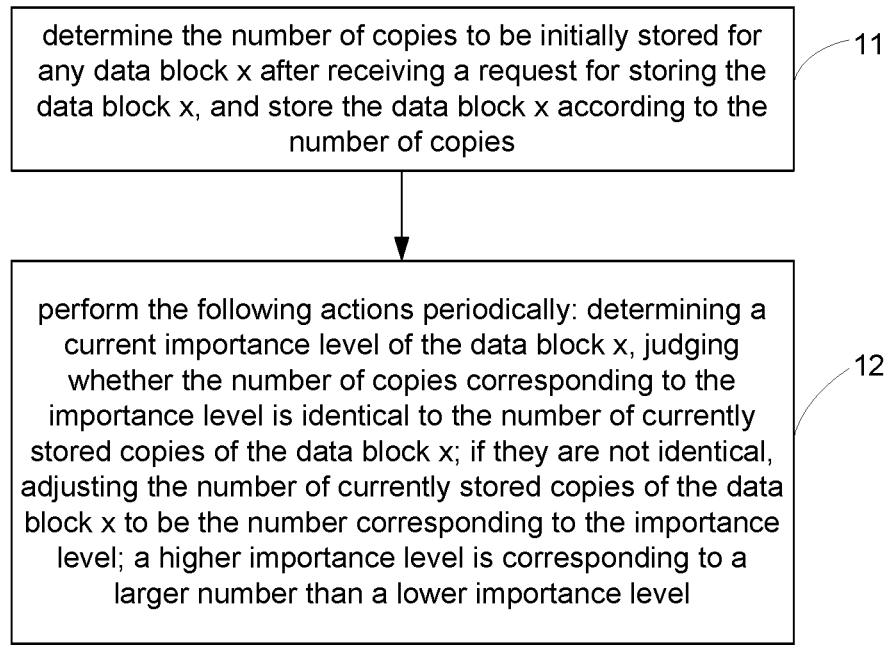
FIG. 1 is a flowchart illustrating a method of storing data in accordance with an embodiment of the present disclosure.

FIG. 1 is a flowchart illustrating a method of storing data in accordance with an embodiment of the present disclosure. As shown in FIG. 1, the method may include the following procedures 11 to 12.

At block 11: the number of copies to be initially stored for a data block x is determined after receiving a request for storing the data block x and the data block x may be stored according to the number of copies to be initially stored.

For simplicity, the data block x represents an arbitrary data block to be stored.

At block 12: the following actions is performed periodically: determining a current importance level of the data block x, determining whether the number of copies corresponding to the importance level is identical to the number of currently stored copies of the data block x, and adjusting the number of currently stored copies of the data block x to be consistent with the number of copies corresponding to the importance level, if the number of copies corresponding to the importance level is not identical to the number of currently stored copies of the data block x. A higher importance level corresponds to more copies to be stored than a lower importance level.

In various examples, there is no distinction between original data and backup data. If the data block x have 3 copies, the 3 copies have equal status.

The above procedures may generally be carried out by a data storage managing server. The data storage managing server may receive a storing request from a user device, and the data block x is stored into data nodes. In practice, each storage server in a system may be referred to as a data node.

The period may be a preset time period, and the specific length of the time period may be determined according to the application scenario. For example, if the frequency of system data being visited is estimated to reach stability within two hours, the period may be defined as 1 hour.

Figure 2:
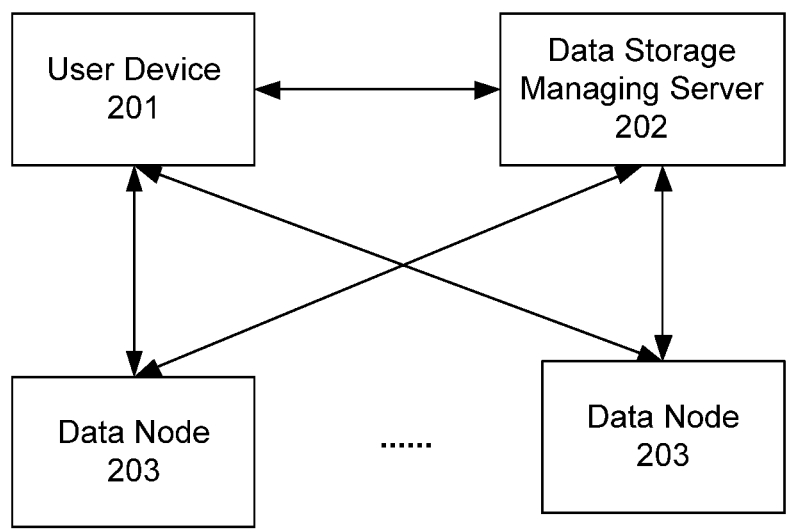
FIG. 2 is a schematic diagram illustrating connections between a user device, a data storage managing server and a data node in accordance with the present disclosure.

FIG. 2 is a schematic diagram illustrating connections between a user device 201, a data storage managing server 202 and data nodes 203. As shown in FIG. 2, there may generally be a plurality of data nodes 203 and a plurality of user device 201. For simplicity, only one user device is shown in FIG. 2.

Figure 3:
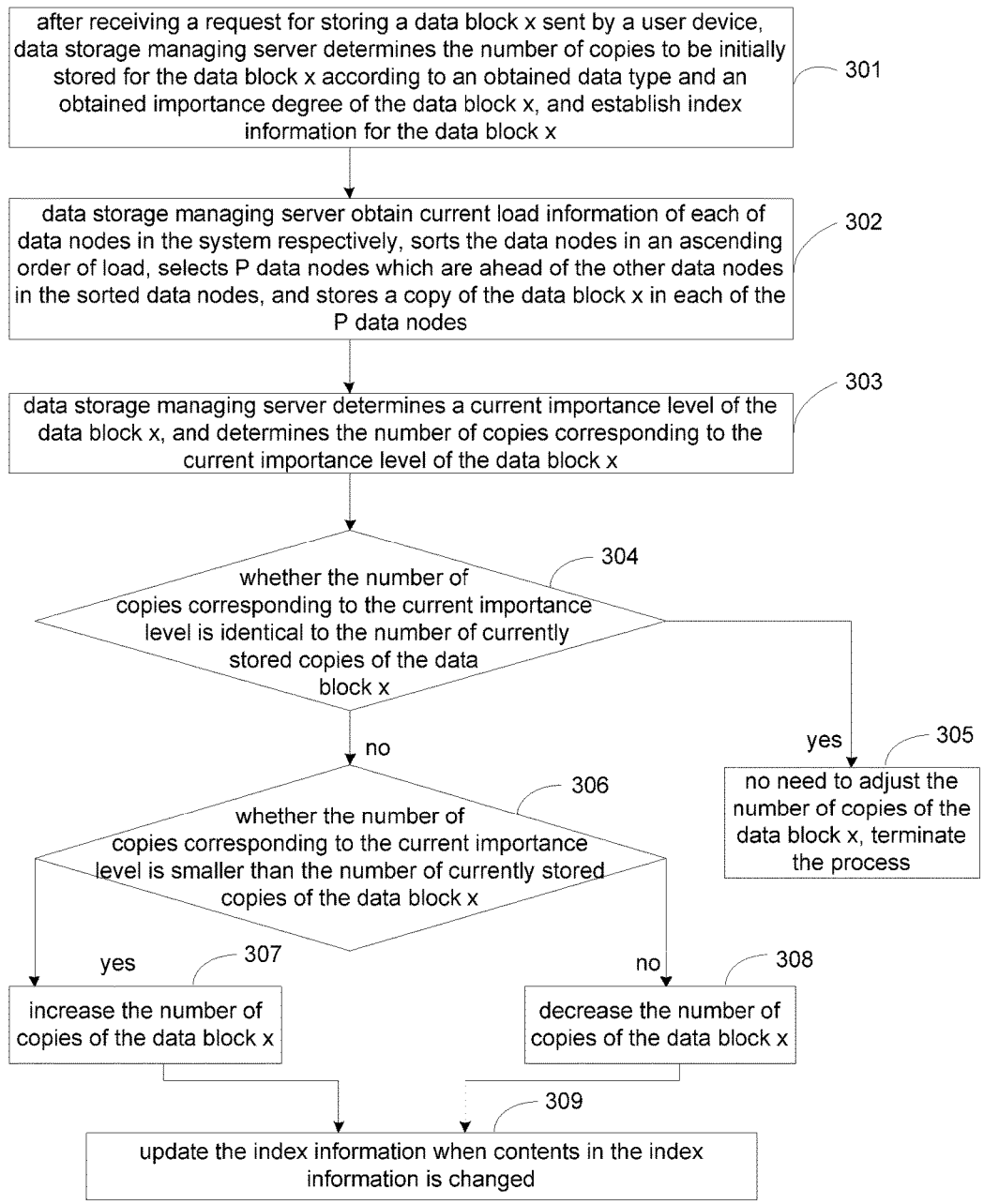
FIG. 3 is a flowchart illustrating a method of storing data in accordance with another embodiment of the present disclosure.

Some examples of the present disclosure are hereinafter described with reference to the above devices. FIG. 3 is a flowchart illustrating a method of storing data in accordance with another embodiment of the present disclosure. The method of storing data may include the following procedures.

At block 301, after receiving a request for storing a data block x sent by a user device, the number of copies to be initially stored for the data block x is determined by the data storage managing server, according to the data type and importance degree of the data block x, and create index information for the data block x.

The data type and the importance degree of the data block x may be sent to the data storage managing server together with the request by the user device. The importance degree may be defined by a user.

The manner of determining the number of copies to be initially stored for data block x according to the data type and the importance degree of data block x is not limited. For example, different data types and different importance degrees may be associated to different values. The weighted average of the two values may be determined to be the number of copies to be initially stored. The number of copies may be one or larger than one.

The index information may include: the data type of the data block x, the importance degree of the data block x, the total number of visits to the data block x within the latest period, the latest number of the stored copies of the data block x, the data node in which each copy of the data block x is stored and the specific location of the copy of the data block x in the data node.

At block 302, the data storage managing server obtains current load information of each data node in the system respectively, sorts the data nodes according to an ascending order of load, selects P data nodes which are ahead of the other data nodes in the sorted data nodes, and stores a copy of data block x in each of the P data nodes. The value of P is a positive integer, and is equal to the number of copies to be initially stored.

In an example, the data storage managing server may inform the user device of the number of copies to be initially stored and the P data nodes to enable the user device to store a copy of data block x in each of the P data nodes.

The load information may include: the number of service channels borne by a data node, network traffic (bit stream), CPU (Central processing unit) utilization, I/O (Input/Output) information, storage device information, or the like. The data storage managing server may obtain the load information of each data node according to a conventional mechanism.

The above procedures in blocks 301 and 302 implement the initial storage of data. Then, the data storage managing server may execute the procedures in blocks 303 to 309 as shown in FIG. 3 periodically.

At block 303, the current importance level of the data block x is determined, and the number of copies corresponding to the current importance level of the data block x may be determined. A higher importance level corresponds to a larger number of copies to be stored, and a lower importance level corresponds to a smaller number of copies to be stored.

The specific number of copies to be stored corresponding to each importance level may be pre-determined according to the needs so long as a higher importance level corresponds to a larger number of copies to be stored than a lower importance level, and is not limited herein.

The data storage managing server may determine the current importance degree of the data block x, according to the data type and the importance level of the data block x and the total number of visits to the data block x within the latest period.

The manner of determining the current importance level of the data block x is not limited in the present disclosure. For example, the importance level may be obtained from calculations using a pre-determined formula. In addition, supposing the data block x has 3 copies, the total number of visits to the data block x in the latest period may refer to the total number of visits to the 3 copies.

At block 304, it is judged whether the number of copies corresponding to the current importance level of the data block x is identical to the number of currently stored copies of the data block x: the procedure in block 305 is performed, if the number corresponding to the current importance level is identical to the number of currently stored copies of the data block x; otherwise the number of currently stored copies of the data block x is adjusted to be identical to the number of copies corresponding to the current importance level of the data block x, and the procedure in block 306 is further performed.

At block 305, if the number of currently stored copies of the data block x is equal to the number of copies corresponding to the current importance level of the data block x, the number of copies of the data block x does not need to be adjusted, and the process is terminated.

The adjusting of the number of copies may include two types of operations, i.e., increasing the number of copies and decreasing the number of copies. The increasing and decreasing are described in the following with reference to examples.

At block 306: it is judged whether the number of currently stored copies of the data block x is smaller than the number corresponding to the current importance level of the data block x: the number of copies of the data block x is to be increased and the procedure in block 307 is performed, if the number of currently stored copies of the data block x is smaller than the number corresponding to the current importance level; otherwise, the number of copies of the data block x is to be decreased and the procedure in block 308 is performed.

At block 307, when the number of currently stored copies of the data block x is smaller than the number corresponding to the current importance level of the data block x, the number of copies of the data block x is increased.

Figure 4:
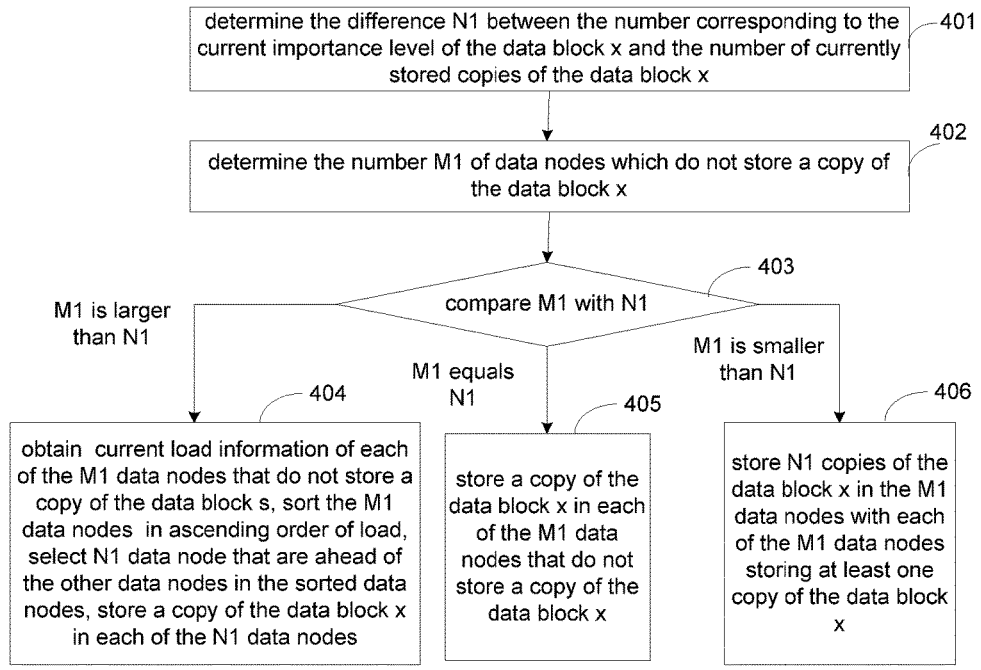
FIG. 4 is a flowchart illustrating a method of increasing stored copies in accordance with an embodiment of the present disclosure.

The process for increasing the copies may be as shown in FIG. 4. FIG. 4 is a flowchart illustrating the process of increasing the number of copies in accordance with an embodiment of the present disclosure.

At block 401, the difference N1 between the number of copies corresponding to the current importance level of data block x and the number of currently stored copies of the data block x is determined. N1 refers to the number of copies to be added.

At block 402, the number of data nodes that do not store a copy of the data block x is determined and denoted as M1.

M1 and N1 are both positive integers.

At block 403, the value of M1 is compared with the value of N1.

When M1 is larger than N1, the procedure in block 404 is performed;
when M1 equals N1, the procedure in block 405 is performed;
when M1 is smaller than N1, the procedure in block 406 is performed;

At block 404: current load information of each of the M1 data nodes which do not store a copy of the data block x is obtained respectively, the M1 data nodes are sorted in an ascending order of load, N1 data nodes which are ahead of the other data nodes in the sorted data nodes are selected, and a copy of the data block x is stored in each of the N1 data nodes respectively.

For example, when M1 is 6 and N1 is 3, current load information of 6 data nodes which do not store a copy of the data block x is obtained, and the 6 data node are sorted in an ascending order of load. 3 data nodes which are ahead of the other data nodes in the sorted data nodes are selected, and a copy of data block x is stored in each of the 3 selected data nodes respectively.

At block 405, when M1 equals N1, a copy of the data block x is stored in each of the M1 data nodes that do not store a copy of the data block x respectively.

For example, when M1 is 3 and N1 is also 3, a copy of the data block x is stored in each of the 3 data nodes that do not store a copy of the data block x respectively.

At block 406, when M1 is smaller than N1, N1 copies of the data block x are stored in the M1 data nodes that do not store a copy of the data block x, with each of the data nodes storing at least one copy of the data bock x, i.e., to distribute the additional data storage task as evenly as possible among the M1 data nodes.

For example, when M1 is 2 and N1 is 3, 3 copies of data block x are stored in the 2 data nodes that do not store a copy of the data block x. Supposing the 2 data nodes that do not store a copy of the data block x are data node a and data node b, and data node a has a lighter load than the data node b, 2 copies of the data block x may be stored in the data node a, and 1 copy of the data block x may be stored in the data node b.

It should be noted that the above are mere examples. Any method of increasing the stored copies may be used according to the actual demand.

According to the above mechanism, copies of data block x may be stored to disperse as widely as possible among different data nodes to enhance data safety.

In addition, if M1 is 0, i.e., there is no data node that does not store the data block x, the additional copies may be stored in data nodes that have stored copies of the data block x, and data nodes with relatively lighter loads may be selected for storing the additional copies.

In an example, in the above block 404, supposing N1 is 3, the data storage managing server may store a copy of data block x in each of selected 3 data nodes. Supposing the selected 3 data nodes are data node a, data node b and data node c respectively, the data storage managing server may obtain current load information of each data node which has stored copies of the data block x, select the data node having the lightest load, read the data block x from the data node having the lightest load, send the data block x to the data node a, data node b and data node c respectively, and inform the data node a, the data node b and the data node c of the number of copies to be stored in each of the data nodes, so that the data node a, data node b and data node c to store the copies accordingly.

At block 308, when the number of currently stored copies of the data block x is larger than the number corresponding to the current importance level of the data block x, the number of copies of the data block x is decreased.

Figure 5:
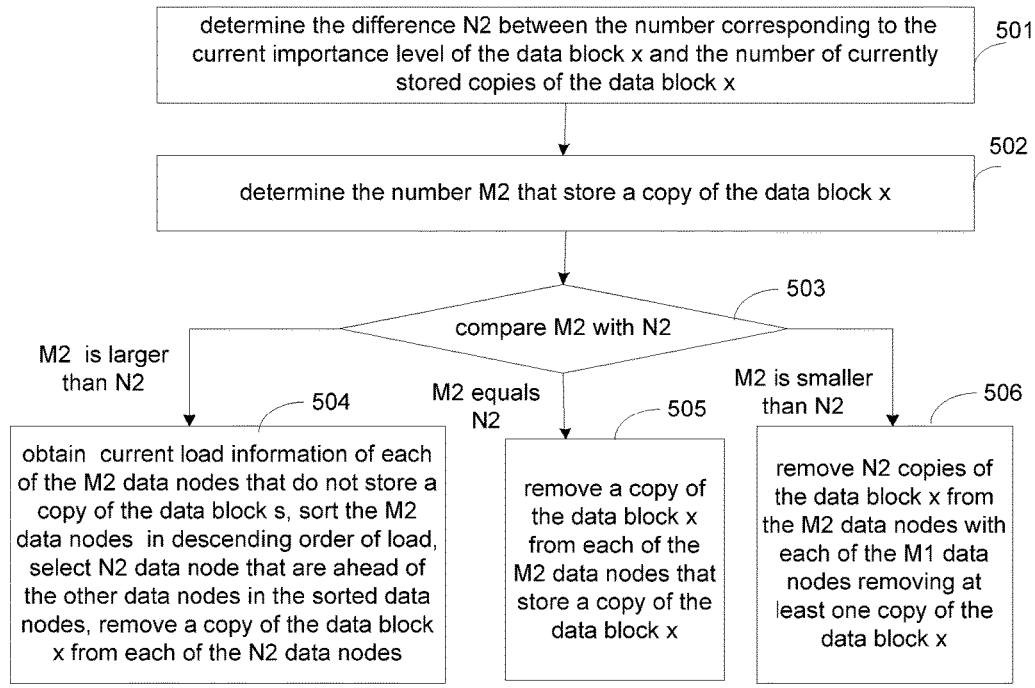
FIG. 5 is a flowchart illustrating a method of decreasing stored copies in accordance with an embodiment of the present disclosure.

The process for decreasing the number is as shown in FIG. 5. FIG. 5 is a flowchart illustrating the process of decreasing the number of copies in accordance with an embodiment of the present disclosure.

At block 501, the difference N2 between the number of copies corresponding to the current importance level of data block x and the number of currently stored copies of the data block x is determined. N2 refers to the number of copies to be removed.

At block 502, the number of data nodes that store copies of the data block x is determined and denoted as M2.

M2 and N2 are both positive integers.

At block 503, the value of M2 is compared with the value of N2.

When M2 is larger than N2, the procedure in block 504 is performed;
when M2 is equal to N2, the procedure in block 505 is performed;

when M2 is smaller than N2, the procedure in block 506 is performed.

At block 504, if M2 is larger than N2, current load information of each of the M2 data nodes which store copies of the data block x may be obtained, the M2 data nodes are sorted in a descending order of load, N2 data nodes which are ahead of the other data nodes in the sorted data nodes are selected, and a copy of data block x is removed from each of the N2 data nodes.

For example, when M2 is 6 and N2 is 3, 6 data nodes which store copies of the data block x are obtained and sorted in a descending order of load. 3 data nodes which are ahead of the other data nodes in the sorted data nodes are selected, and a copy of data block x is removed from each of the 3 selected data nodes.

At block 505, when M2 equals N2, a copy of the data block x is removed from each of the M2 data nodes that store copies of the data block x respectively.

For example, when M2 is 3 and N2 is also 3, a copy of the data block x may be removed from each of 3 data nodes that have stored copies of the data block x.

At block 506, when M2 is smaller than N2, N2 copies of the data block x are removed from the M2 data nodes that have stored copies of the data block x, with each of the data nodes removing at least one copy of the data bock x, i.e., to distribute the removing task as evenly as possible among the M2 data nodes.

For example, when M2 is 2 and N2 is 3, supposing data nodes that have stored copies of the data block x are data node a and data node b which respectively store 2 copies of the data block x, and supposing the data node a has a heavier load than the data node b, two copies of the data block x may be removed from the data node a and one copy of the data block x may be removed from the data node b.

It should be noted that the above are mere examples. Any method of decreasing the stored copies may be used according to the actual demand.

At block 309, when contents in the index information is changed, the index information is updated.

In practice, data bocks as mentioned herein may be video data blocks, and the index information of the data block x may also include: the start time and end time of the data block x, i.e., the start time and end time of the video.

Figures 6, 7:
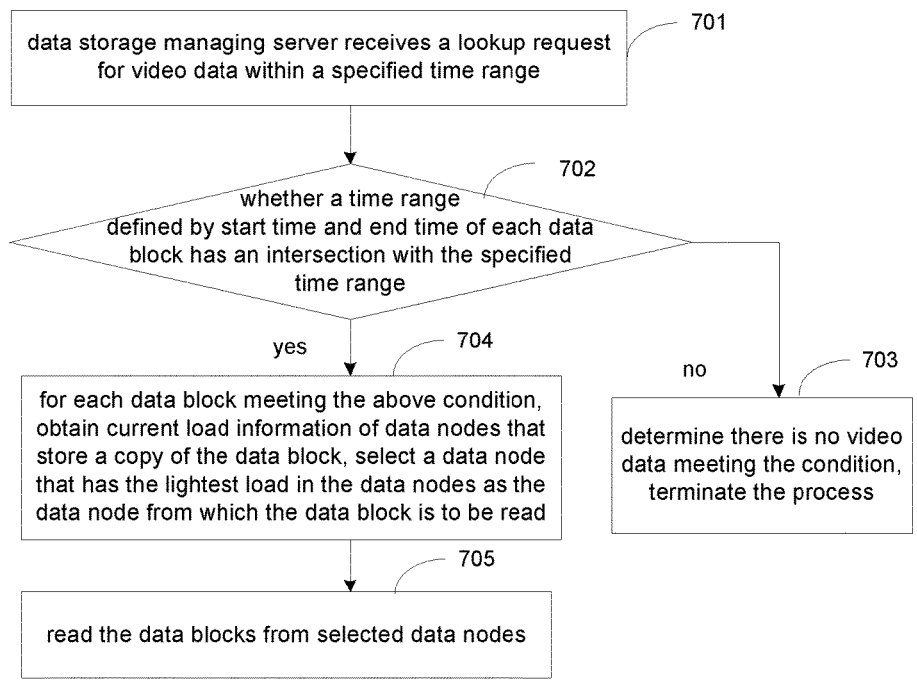
FIG. 6 is a schematic diagram illustrating index information of data block x in accordance with the present disclosure.
FIG. 7 is a flowchart illustrating a method of reading data in accordance with an embodiment of the present disclosure.

FIG. 6 is a schematic diagram illustrating index information of data block x in accordance with the present disclosure. When the number of copies of the data block x or the total number of visits to the data block x is changed, the index information as shown in FIG. 6 may be updated accordingly. In addition, the data storage managing server may obtain information required by looking up the index information as shown in FIG. 6, e.g., the data nodes that have stored copies of the data block x, the data type of the data block x, the importance degree of the data block x, and the total number of visits to the data block x, or the like.

As in the above, the data blocks may generally be video data blocks, the data storage managing server may identify the data block to be searched for and the corresponding data node from which the data block is to be read, and read the data block from each of the corresponding data node, after receiving a lookup request for video data within a specified time range sent by a user device. FIG. 7 is a flowchart illustrating a method of reading data in accordance with an embodiment of the present disclosure. The method may include the following procedures.

At block 701, the data storage managing server receives a lookup request for video data within a specified time range.

At block 702, it is judged whether the start time and end time of each data block defines a time range having an intersection with the specified time range, according to stored index information of each data block: the procedure in block 703 is performed if they do not have an intersection; if the time range has an intersection with the specified time range, data blocks whose time range having intersection with the specified time range are identified from among the data blocks, and the procedure in block 704 is performed.

For example, when the specified time range is 13:00~15:00, the start time and end time of data block x1 are 12:30 and 13:30, the start time and end time of data block x2 are 13:30 and 14:30, the start time and end time of data block x3 are 14:30 and 15:30, data block x1, data block x2 and data block x3 are determined as the data blocks whose the time range defined by respective start time and end time has an intersection with the specified time range.

At block 703, it is determined that there is no video data required by the lookup request, and the process is terminated.

At block 704, the following operations is performed for each data block identified: obtaining current load information of each of data nodes that has stored copies of the data block, and selecting the data node with the lightest load as the data node from which the data block is to be read.

For example, data node a, which is the data node having the lightest load in all of data nodes that have stored copies of the data block x1, may be selected as the data node from which the data block x1 is to be read; data node b, which is the data node having the lightest load in all of data nodes that have stored copies of the data block x2, may be selected as the data node from which the data block x2 is to be read; data node c, which is the data node having the lightest load in all of data nodes that have stored copies of the data block x3, may be selected as the data node from which the data block x3 is to be read.

At block 705, the data blocks are read from the data nodes selected respectively.

In an example, the data storage managing server may send read commands concurrently to the data node a, the data node b and the data node c, which are selected for reading the data blocks so as to read the data blocks x1, x2 and x3. The reading procedure may follow a conventional procedure.

Figure 8:
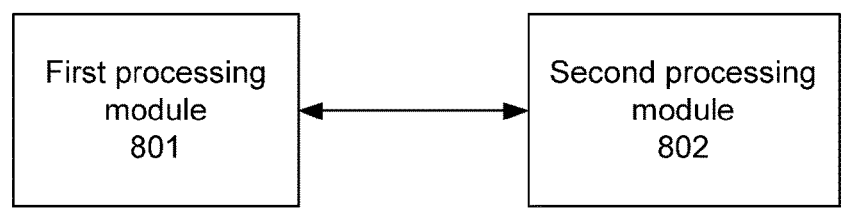
FIG. 8 is a schematic diagram illustrating the structure of a data storage managing server in accordance with an embodiment of the present disclosure.

Based on the above, FIG. 8 is a schematic diagram illustrating the structure of a data storage managing server in accordance with an embodiment of the present disclosure. As shown in FIG. 8, the server may include: a first processing module 801 and a second processing module 802.

The first processing module 801 is configured to determine the number of copies to be initially stored for a data block x after receiving a request for storing the data block x sent by a user device, instruct the user device to store the data block x into data nodes according to the number of copies, and instruct a second processing module to start functioning.

The second processing module 802 is configured to perform the following actions periodically: determining a current importance level of the data block x, determining whether the number of copies corresponding to the importance level is identical to the number of currently stored copies of the data block x, and adjusting the number of the currently stored copies of the data block x to be consistent with the number of copies corresponding to the importance level when the number of copies corresponding to the importance level is not identical to the number of currently stored copies. A higher importance level is corresponding to more copies than a lower importance level.

In an example, the first processing module may determine the number of copies to be initially stored for the data block x according to the data type and the importance degree of the data block x. The importance degree may be defined by a user.

The second processing module may determine the current importance degree of the data block x according to the data type and the importance level of the data block x and the total number of visits to the data block x within the latest period.

In an example, the first processing module may also obtain current load information of the data nodes, sort the data nodes in an ascending order of load, select P data nodes which are ahead of the other data nodes in the sorted data nodes, and instruct the user device to store a copy of the data block x in each of the P data nodes. The value of P is the same with the number of copies.

In an example, the second processing module may also determine the difference N1 between the number of copies corresponding to the importance level and the number of currently stored copies of the data block x when the number of currently stored copies is smaller than the number corresponding to the importance level, and determine the number M1 of data nodes that do not store a copy of the data block x.

When M1 is larger than N1, the second processing module may obtain current load information of each of the M1 data nodes which do not store a copy of the data block x, sort the M1 data nodes in an ascending order of load, select N1 data nodes which are ahead of the other data nodes in the sorted data nodes, and store a copy of the data block x in each of the N1 data nodes.

When M1 is equal to N1, the second processing module may store a copy of the data block x in each of the M1 data nodes that do not store a copy of the data block x.

When M1 is smaller than N1, the second processing module may store N1 copies of the data block x in the M1 data nodes that have not stored a copy of the data block x with each of the data nodes storing at least one copy.

The second processing module may also obtain current load information of data nodes that have stored copies of the data block x respectively, select the data node that has the lightest load, and read the data block x from the selected data node for storing the N1 copies.

In an example, the second processing module may also determine the difference N2 between the number of currently stored copies of the data block x and the number of copies corresponding to the importance level when the number of currently stored copies is larger than the number corresponding to the importance level, and determine the number M2 of data nodes that have stored copies of the data block x.

When M2 is larger than N2, the second processing module may obtain current load information of each of the M2 data nodes which store copies of the data block x, sort the M2 data nodes in a descending order of load, select N2 data nodes which are ahead of the other data nodes in the sorted data nodes, and remove a copy of data block x from each of the N2 data nodes.

When M2 equals N2, the second processing module may remove a copy of the data block x from each of the M2 data nodes that store copies of the data block x.

When M2 is smaller than N2, the second processing module may remove N2 copies of the data block x from the M2 data nodes that store copies of the data block x with at least one copy removed from each of the data nodes.

In an example, the first processing module may also establish index information for the data block x, and update the index information when contents in the index information is changed.

The index information may include: the data type of the data block x, the importance degree of the data block x, the total number of visits to the data block x within the latest period, a latest number of stored copies of the data block x, the data node in which each copy of the data block x is stored and the specific location of the copy of the data block x in the data node.

In an example, when the data block x is a video data block, the index information may also include: start time and end time of the data block x.

Correspondingly, the second processing module may also identify data nodes meeting the following conditions from all of data blocks according to index information of the data nodes after receiving a lookup request for video data within a specified time range: a time range defined by the start time and end time of the data block has an intersection with the specified time range. The following procedures may be performed for each of the data blocks identified: obtaining current load information of each data node that stores a copy of the data block, selecting the data node having the lightest load as the data node from which the data block is to be read; sending a read command to the data node to read the data block.

In an example, the second processing module may send read commands concurrently to the data nodes storing the data blocks.

Figure 9:
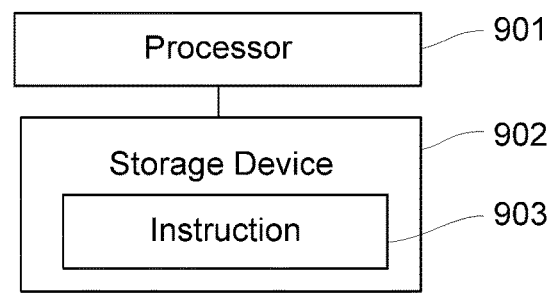
FIG. 9 is a schematic diagram illustrating the structure of a data storage managing server in accordance with another embodiment of the present disclosure.

FIG. 9 is a schematic diagram illustrating the structure of a data storage managing server in accordance with another embodiment of the present disclosure. As shown in FIG. 9, a target device may include at least one processor 901, storage device 902 and at least one instruction 903 which is stored in the storage device 902 and is executable by the at least one processor 901. The storage device 902 may include a first processing module and a second processing module. The virtual modules may include instructions 903 for fulfilling respective functions. When the processor 901 communicates with the storage device 902, reads and executes the instructions, the device may implement corresponding functions.

Generally, the mechanism of the present disclosure, any data block x may be stored according to a determined number of initially stored copies which are backup for each other. The number of copies may be adjusted according to changes in the importance level of the data block x, i.e., when the importance level becomes higher, the number of copies may be increased; when the importance level becomes lower, the number of copies may be decreased. As such, at least a problem in the conventional mechanism is solved, and storage resources can be used rationally.

In addition, the backup operation is generally implemented manually in the conventional mechanism. Each procedure of the present disclosure may be implemented automatically, thus user's operation is simplified.

In addition, the data storage and copy number adjustment of the present disclosure all take load balancing into consideration. Read commands are sent to data nodes concurrently for reading data, thus the system performances and stability can be improved.

Further, the backup data is used only when the original data is lost or damaged in conventional mechanism, and is left idle in other time. But according to the present disclosure, original data is not distinguished from backup data, and the data block x is read from any data node (having the lightest load) that stores the data block x, i.e., storage resources occupied by each data block x are not left completely idle, thus utility ratio of the storage resource can be improved.

The foregoing descriptions are only preferred embodiments of this invention and are not for use in limiting the protection scope thereof. Any modification, equivalent replacement and improvement made under the spirit and principle of the present invention should be included in the protection scope thereof.

The invention claimed is:

1. A method of storing data, comprising,
determining a number of copies to be initially stored for a data block x, after receiving a request for storing the data block x, storing the data block x according to the number of copies to be initially stored; and
performing the following actions periodically: determining a current importance level of the data block x, determining whether a number of copies corresponding to the importance level is identical to a number of currently stored copies of the data block x, and adjusting the number of currently stored copies of the data block x to be consistent with the number of copies corresponding to the importance level if the number of copies corresponding to the importance level is not identical to the number of currently stored copies of the data block x; wherein a higher importance level is corresponding to more copies than a lower importance level.

2. The method of claim 1, wherein
determining the number of copies to be initially stored for the data block x comprises: determining the number of copies to be initially stored for the data block x, according to an obtained data type and an obtained importance degree of the data block x, wherein the importance degree is defined by a user; and
determining a current importance level of the data block x comprises: determining the current importance level of the data block x, according to the obtained data type and the obtained importance degree and a total number of visits to the data block x within a latest period.

3. The method of claim 2, wherein
storing the data block x according to the number of copies to be initially stored comprises:
obtaining current load information of each of data nodes respectively, and sorting the data nodes in an ascending order of load;
selecting P data nodes which are ahead of other data nodes in the sorted data nodes, and storing a copy of the data block x in each of the P selected data nodes;
wherein the value of P is a positive integer and equal to the number of copies to be initially stored.

4. The method of claim 3, wherein
adjusting the number of currently stored copies of the data block x to be consistent with the number of copies corresponding to the importance level comprises:
determining a difference N1 between the number of copies corresponding to the importance level and the number of currently stored copies of the data block x, when the number of currently stored copies is smaller than the number corresponding to the importance level, and determining the number M1 of data nodes that do not store a copy of the data block x; wherein M1 and N1 are positive integers;
when M1 is larger than N1, obtaining current load information of each of the M1 data nodes which do not store a copy of the data block x, sorting the M1 data nodes in an ascending order of load, selecting N1 data nodes which are ahead of other data nodes in the sorted data nodes, and storing a copy of the data block x in each of the N1 data nodes;
when M1 is equal to N1, storing a copy of the data block x in each of the M1 data nodes that do not store a copy of the data block x; and
when M1 is smaller than N1, storing N1 copies of the data block x in the M1 data nodes that have not stored a copy of the data block x with each of the M1 data nodes storing at least one copy.

5. The method of claim 4, further comprising:
establishing index information for the data block x, and updating the index information when contents in the index information are changed;
wherein the index information comprises: the data type of the data block x, the importance degree of the data block x, the total number of visits to the data block x within the latest period, a latest number of stored copies of the data block x, a data node in which each copy of the data block x is stored and a specific location of the copy of the data block x in the data node.

6. The method of claim 5, wherein
when the data block x is a video data block, the index information further comprises: start time and end time of the data block x;
the method further comprises:
after receiving a lookup request for video data within a specified time range, determining data blocks which meet the following condition from all of data blocks, according to index information of the data blocks: a time range defined by start time and end time of the data block has an intersection with the specified time range;
performing the following actions for each of the data blocks determined: obtaining current load information of each of data nodes that stores a copy of the data block, and selecting a data node having the lightest load as a data node from which the data block is to be read;
reading the data blocks from the data node selected.

7. The method of claim 3, wherein
adjusting the number of currently stored copies of the data block x to be consistent with the number of copies corresponding to the importance level comprises:
determining a difference N2 between the number of copies corresponding to the importance level and the number of currently stored copies of the data block x, when the number of currently stored copies is larger than the number corresponding to the importance level, and determining a number M2 of data nodes that store a copy of the data block x; wherein M2 and N2 are positive integers;
when M2 is larger than N2, obtaining current load information of each of the M2 data nodes which store copies of the data block x, sorting the M2 data nodes in a descending order of load, selecting N2 data nodes which are ahead of other data nodes in the sorted data nodes, and removing a copy of data block x from each of the N2 data nodes;
when M2 equals N2, removing a copy of the data block x from each of the M2 data nodes that store a copy of the data block x; and
when M2 is smaller than N2, removing N2 copies of the data block x from the M2 data nodes that store at least one copy of the data block x with at least one copy removed from each of the M2 data nodes.

8. The method of claim 7, further comprising:
establishing index information for the data block x, and updating the index information when contents in the index information are changed;
wherein the index information comprises: the data type of the data block x, the importance degree of the data block x, the total number of visits to the data block x within the latest period, a latest number of stored copies of the data block x, a data node in which each copy of the data block x is stored and a specific location of the copy of the data block x in the data node.

9. A data storage managing server, comprising at least one processor and a memory storing one or a plurality of instructions executable by the at least one processor to:
determine a number of copies to be initially stored for a data block x, after receiving a request for storing the data block x sent by a user device, instruct the user device to store the data block x into data nodes according to the number of copies to be initially stored; and
perform the following actions periodically: determining a current importance level of the data block x, determining whether a number of copies corresponding to the importance level is identical to a number of currently stored copies of the data block x, and adjusting the number of the currently stored copies of the data block x to be consistent with the number of copies corresponding to the importance level when the number of copies corresponding to the importance level is not identical to the number of currently stored copies of the data block x; wherein a higher importance level is corresponding to more copies than a lower importance level.

10. The data storage managing server of claim 9, wherein the instructions are executable by the at least one processor to:
determine the number of copies to be initially stored for the data block x according to an obtained data type and an obtained importance degree of the data block x, wherein the importance degree is defined by a user; and
determine the current importance level of the data block x according to the obtained data type and the obtained importance degree of the data block x and the total number of visits to the data block x within the latest period.

11. The data storage managing server of claim 10, wherein the instructions are executable by the at least one processor to:
obtain current load information of respective data nodes, sort the data nodes in an ascending order of load, select P data nodes which are ahead of other data nodes in the sorted data nodes, and instruct the user device to store a copy of the data block x in each of the P data nodes; wherein the value of P is the same with the number of copies to be initially stored, wherein P is a positive integer.

12. The data storage managing server of claim 11, wherein the instructions are executable by the at least one processor to:
determine a difference N1 between the number of copies corresponding to the importance level and the number of currently stored copies of the data block x when the number of currently stored copies is smaller than the number corresponding to the importance level, and determining the number M1 of data nodes that do not store a copy of the data block x; wherein M1 and N1 are positive integers;
when M1 is larger than N1, obtain current load information of each of the M1 data nodes which do not store a copy of the data block x, sort the M1 data nodes in an ascending order of load, selecting N1 data nodes which are ahead of other data nodes in the sorted data nodes, and store a copy of the data block x in each of the N1 data nodes;
when M1 is equal to N1, store a copy of the data block x in each of the M1 data nodes that do not store a copy of the data block x; and
when M1 is smaller than N1, store N1 copies of the data block x in the M1 data nodes that have not stored a copy of the data block x with each of the M1 data nodes storing at least one copy.

13. The data storage managing server of claim 12, wherein the instructions are executable by the at least one processor to:
obtain current load information of each of data nodes that stores a copy of the data block x, select a data node that has the lightest load, and read the data block x from the selected data node for storing the N1 copies.

14. The data storage managing server of claim 13, wherein the instructions are executable by the at least one processor to:
establish index information for the data block x, and update the index information when contents in the index information are changed;
wherein the index information comprises: the data type of the data block x, the importance degree of the data block x, the total number of visits to the data block x within the latest period, a latest number of stored copies of the data block x, a data node in which each copy of the data block x is stored and a specific location of the copy of the data block x in the data node.

15. The data storage managing server of claim 12, wherein the instructions are executable by the at least one processor to:
establish index information for the data block x, and update the index information when contents in the index information are changed;
wherein the index information comprises: the data type of the data block x, the importance degree of the data block x, the total number of visits to the data block x within the latest period, a latest number of stored copies of the data block x, a data node in which each copy of the data block x is stored and a specific location of the copy of the data block x in the data node.

16. The data storage managing server of claim 15, wherein
when the data block x is a video data block, the index information further comprises: start time and end time of the data block x;
wherein the instructions are executable by the at least one processor to: identify data blocks meeting the following condition from all of data blocks, according to index information of the data nodes after receiving a lookup request for video data within a specified time range: a time range defined by start time and end time of the data block has an intersection with the specified time range; perform the following procedures for each of the data blocks identified: obtaining current load information of each of data nodes that store a copy of the data block, selecting data nodes having the lightest load as the data node from which the data block is to be read;

sending a read command to each of the data nodes selected to read the data block.

17. The data storage managing server of claim 16, wherein the instructions are executable by the at least one processor to: send a read command to each of the data nodes selected concurrently.

18. The data storage managing server of claim 11, wherein the instructions are executable by the at least one processor to:
 determine a difference N2 between the number of currently stored copies of the data block x and the number of copies corresponding to the importance level when the number of currently stored copies is larger than the number corresponding to the importance level, and determining a number M2 of data nodes that store a copy of the data block x; wherein M2 and N2 are positive integers;
 when M2 is larger than N2, obtain current load information of each of the M2 data nodes which store copies of the data block x, sort the M2 data nodes in a descending order of load, select N2 data nodes which are ahead of other data nodes in the sorted data nodes, and remove a copy of data block x from each of the N2 data nodes;
 when M2 equals N2, remove a copy of the data block x from each of the M2 data nodes that store a copy of the data block x;
 when M2 is smaller than N2, remove N2 copies of the data block x from the M2 data nodes that store at least one copy of the data block x with at least one copy removed from each of the M2 data nodes.

19. The data storage managing server of claim 18, wherein the instructions are executable by the at least one processor to:
 establish index information for the data block x, and update the index information when contents in the index information are changed;
 wherein the index information comprises: the data type of the data block x, the importance degree of the data block x, the total number of visits to the data block x within the latest period, a latest number of stored copies of the data block x, a data node in which each copy of the data block x is stored and a specific location of the copy of the data block x in the data node.

* * * * *